United States Patent
Keyes et al.

(10) Patent No.: US 6,516,427 B1
(45) Date of Patent: Feb. 4, 2003

(54) NETWORK-BASED REMOTE DIAGNOSTIC FACILITY

(75) Inventors: Charles K. Keyes, Boise, ID (US);
James M. Sangroniz, Boise, ID (US);
James E. Obert, Boise, ID (US);
William A. Cox, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/435,252

(22) Filed: Nov. 5, 1999

(51) Int. Cl.[7] .................................................. G06F 11/00
(52) U.S. Cl. ............................. 714/25; 714/44; 714/46; 709/226
(58) Field of Search .............................. 714/25, 44, 5, 714/46; 709/227

(56) References Cited

U.S. PATENT DOCUMENTS

| | | | | |
|---|---|---|---|---|
| 4,837,680 A | * | 6/1989 | Crockett et al. ............... | 360/69 |
| 5,694,528 A | * | 12/1997 | Hube ......................... | 358/1.14 |
| 5,909,493 A | * | 6/1999 | Motoyama .................. | 713/154 |
| 6,065,136 A | * | 5/2000 | Kuwabara .................. | 709/217 |
| 6,094,679 A | * | 7/2000 | Teng et al. .................. | 709/217 |
| 6,327,045 B1 | * | 12/2001 | Teng et al. ................. | 358/1.15 |
| 6,393,497 B1 | * | 5/2002 | Arnold et al. .............. | 709/315 |

* cited by examiner

Primary Examiner—Robert Beausoliel
Assistant Examiner—Yolanda L Wilson

(57) ABSTRACT

The invention is utilized in the context of a peripheral device that is coupled to a network via a firewall which blocks unwanted incoming message traffic, except for incoming message traffic that is responding to a message dispatched from the peripheral device. A remotely located diagnostic device, which includes code for diagnosis of causes of peripheral device malfunctions, is connected to communicate via the network. The peripheral device includes a memory for storing a diagnostic application that is adapted to execute one or more diagnostic subroutines for diagnosing a cause of a device malfunction. The peripheral device is enabled to dispatch an event message to the remote diagnostic device and to receive a response message from the remote diagnostic device (all via the firewall and the network). The response message causes a diagnostic application to execute a subroutine on the peripheral device in an attempt to determine the cause of the event. In the case where the remote diagnostic device is adapted to download an executable diagnostic subroutine, the peripheral device executes the diagnostic subroutine.

20 Claims, 4 Drawing Sheets

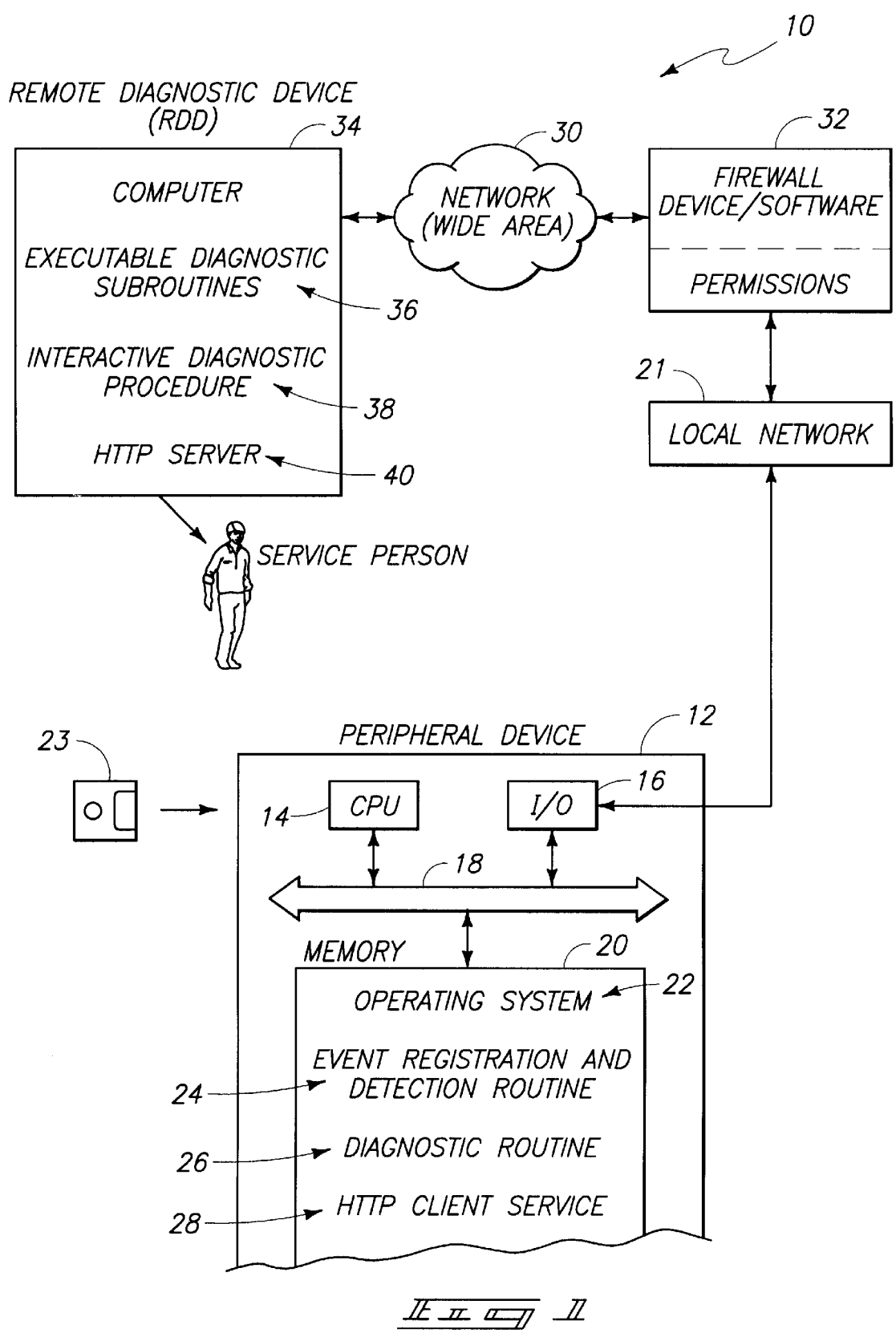

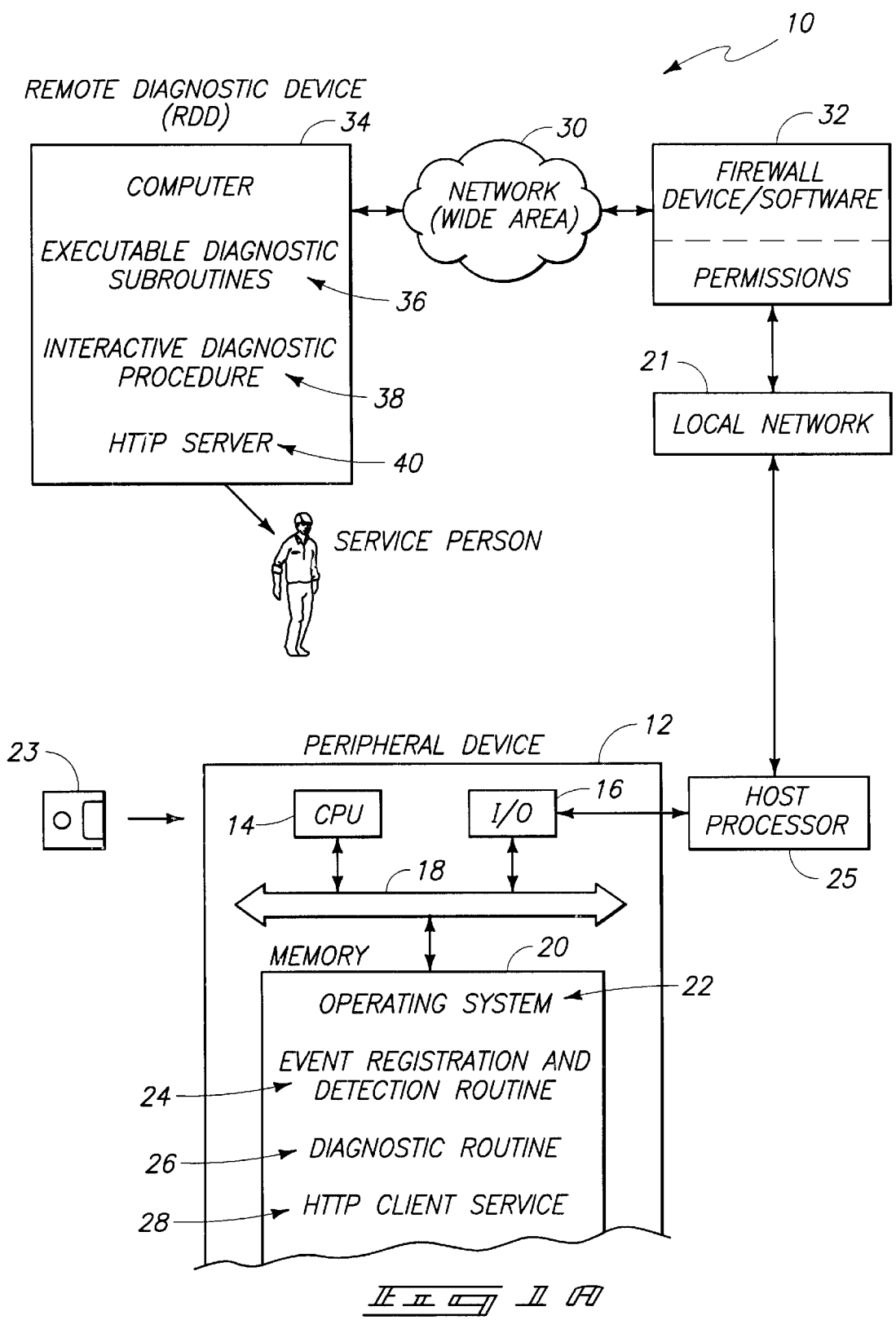

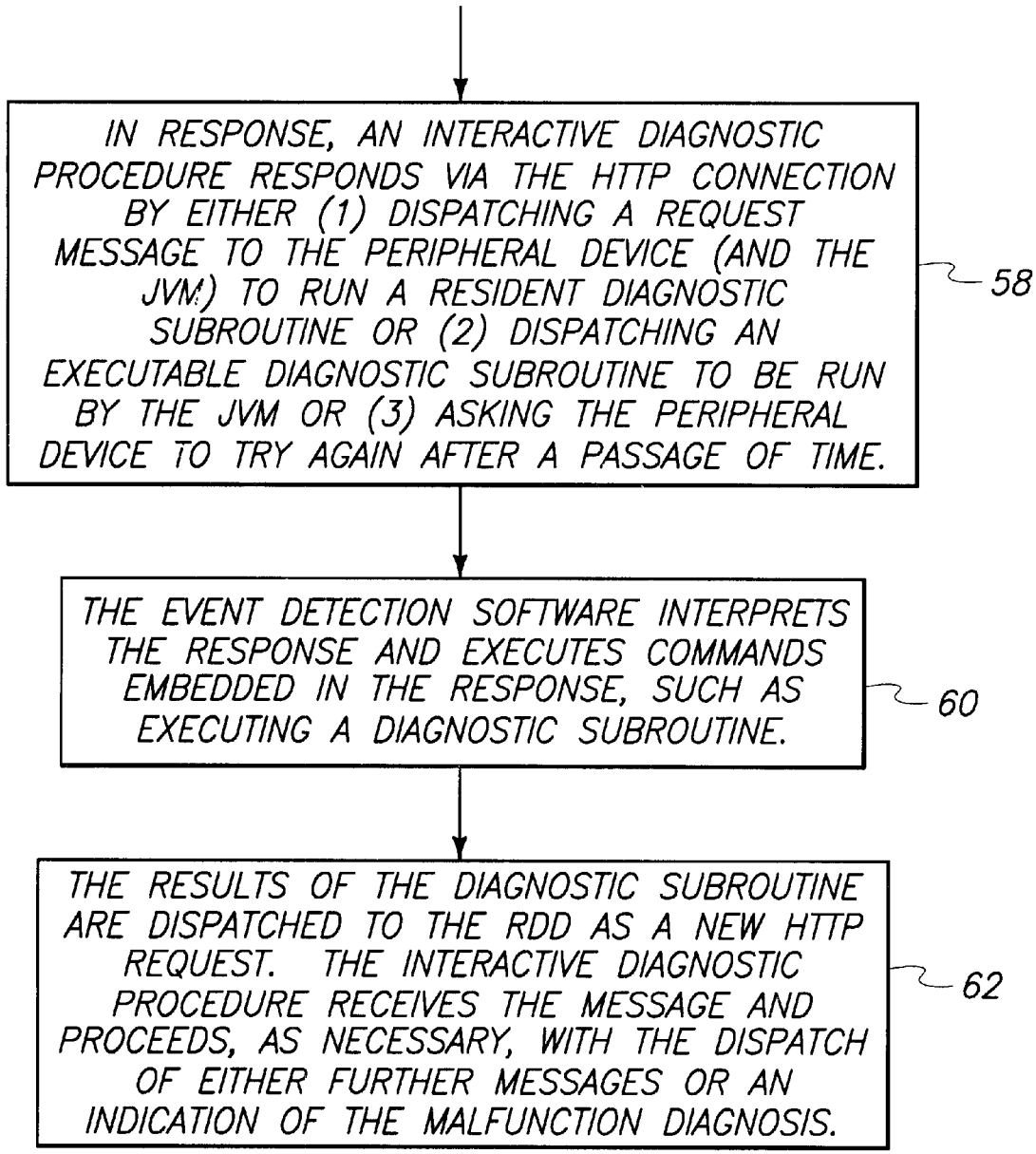

NETWORK-BASED REMOTE DIAGNOSTIC FACILITY

FIELD OF THE INVENTION

This invention relates to remote diagnosis of peripheral device malfunctions and, more particularly, to a facility for enabling remote diagnosis of such malfunctions when a firewall device resides between a diagnostic device and the peripheral device experiencing a malfunction.

BACKGROUND OF THE INVENTION

Currently, when a remotely located peripheral device experiences a malfunction, and a locally-based user is not able to resolve the malfunction, a call is made to a service center and a human-to-human interchange occurs. That call may result in the user being instructed to replace a larger module than would otherwise be replaced if detailed fault analysis was available on site. The call may also require that a service person be dispatched to resolve the problem. These solutions are inherently expensive.

In order to avoid such an expense, diagnostic facilities have been developed that enable a remotely located diagnostic device to obtain information about the malfunctioning peripheral device, without requiring a physical presence at the malfunctioning device. Typically, in the past, equipment manufacturers have employed network protocols such as "Simple Network Management Protocol" (SNMP) to perform remote system diagnostics. A person within an organization, where the malfunctioning device is located, is generally charged with management of information services and can utilize SNMP-based software tools to query the status of the malfunctioning device or to invoke a built-in diagnostic functionality and monitor the test results remotely. The chief problem with this approach is that management information systems personnel are generally in short supply and are often not able to respond to such a problem.

Accordingly, many organizations prefer to outsource equipment support to equipment manufacturers or third-party support providers. To allow such external support organizations to use a network-based remote diagnostic tool, requires allowing these organizations access to an local network, generally via an external network, such as the Internet. The problem with this solution is that most local networks are coupled to the Internet via a firewall which only allows unsupervised bilateral passage of e-mail messages. All other incoming messages are blocked, unless they are in response to a specifically identified outgoing message originating from within the organization's network.

A recently introduced remote support method involves the addition of a modem and phone to the equipment. In this method, the peripheral device can "place a phone call" to a remote diagnostic center that then processes information coming from the malfunctioning device. This-method avoids the firewall problem but introduces problems of its own. For instance, it requires special phone lines to be strung to the equipment and entails the additional cost of such dedicated phone lines, cables, etc. Further, those phone cables may be redundant to the network cabling already connected to the equipment.

Various programming systems enable remote interchange of data between peripheral systems and, more particularly, control of remotely located devices via embedded software. One well-known facility exists on the World-Wide Web (WWW) and is known as the Hypertext Transfer Protocol (HTTP). This is a standard WWW data transfer protocol wherein each interaction consists of one ASCII Request message followed by one Response message. The HTTP protocol includes two distinct items: a set of Requests from browsers to servers and a set of Responses going back the other way. HTTP supports two kinds of Requests, i.e., simple Requests and full Requests. A simple Request is just a single "get" line naming a desired page, without the protocol version. A full Request is indicated by the presence of a protocol version on the "get" Request line. Essentially, the get method requests a server to send a web page to the requesting party.

In addition to the HTTP messaging protocol, various programming systems enable control of embedded routines in remote devices. The Java language provides such a capability via the Java Virtual Machine (JVM) which, when installed on a device, enables a Java program to run in such a manner that it is isolated from the native run time environment. This thereby affords portability between machines that is not achievable through native binary executable code. Essentially, a JVM is en embedded piece of software/firmware that can be caused to run either locally stored subroutines or remotely supplied subroutines.

Further protocols enable a similar capability. Among those are the Microsoft "Component Object Model" (COM) that is a client/server, object-based programming model designed to promote software interoperability; and the Common Object Request Broker Architecture (CORBA) adopted by the OMG Consortium. COM provides a means for client objects to make use of server objects, despite the fact that the two entities may have been developed by separate organizations, using different programming languages at different times. DCOM is an extension of the COM programming model and allows COM clients to manipulate COM objects that are located on physically separated machines through what amounts to remote procedure calls. CORBA provides similar capabilities. Notwithstanding the availability of these distributed processing/communication models, the presence of firewalls create problems in regards to their respective implementations.

It is therefore an object of this invention to provide a programming system that enables a remotely located device to perform diagnostic routines for the purpose of analyzing malfunction states.

It is another object of this invention to provide a remote malfunction diagnosis capability that can operate in the presence of a firewall facility that protects a device to be diagnosed.

It is yet another object of this invention to provide a remote diagnosis facility that can download executable diagnostic code through a firewall to a device evidencing a malfunction.

It is still another object of the invention to allow operation a remote diagnostic system in the presence of a firewall, without modification of the firewall's security procedures.

SUMMARY OF THE INVENTION

The invention is utilized in the context of a peripheral device that is coupled to a network via a firewall which blocks unwanted incoming message traffic, except for incoming message traffic that is responding to a message dispatched from the peripheral device. A remotely located diagnostic device, which includes code for diagnosis of causes of peripheral device malfunctions, is connected to communicate via the network.

The peripheral device includes a processor for controlling its operation, a memory for storing a diagnostic application that, in combination with the processor, is adapted to execute one or more diagnostic subroutines for diagnosing a cause of a device malfunction. The peripheral device incorporates a communication facility that is enabled to dispatch an event message to the remote diagnostic device and to receive a response message from the remote diagnostic device (all via the network and through the firewall). The response message instructs the peripheral to execute a diagnostic subroutine.

Accordingly, the remote device is able to dynamically control diagnostic subroutines in the peripheral device so as to interactively diagnose the malfunction.

BRIEF DESCRIPTION OF THE DRAWINGS

FIG. 1 is a high level block diagram of a first embodiment of the invention wherein a peripheral device includes the necessary software/firmware to implement the invention without an intervening host processor.

FIG. 1a is a high level block diagram of a second embodiment the invention wherein a host processor is interposed between a network and the peripheral device.

FIGS. 2a, 2b are a flow diagram illustrating the procedure of the invention.

DETAILED DESCRIPTION OF THE PREFERRED EMBODIMENT

Figure 2A:
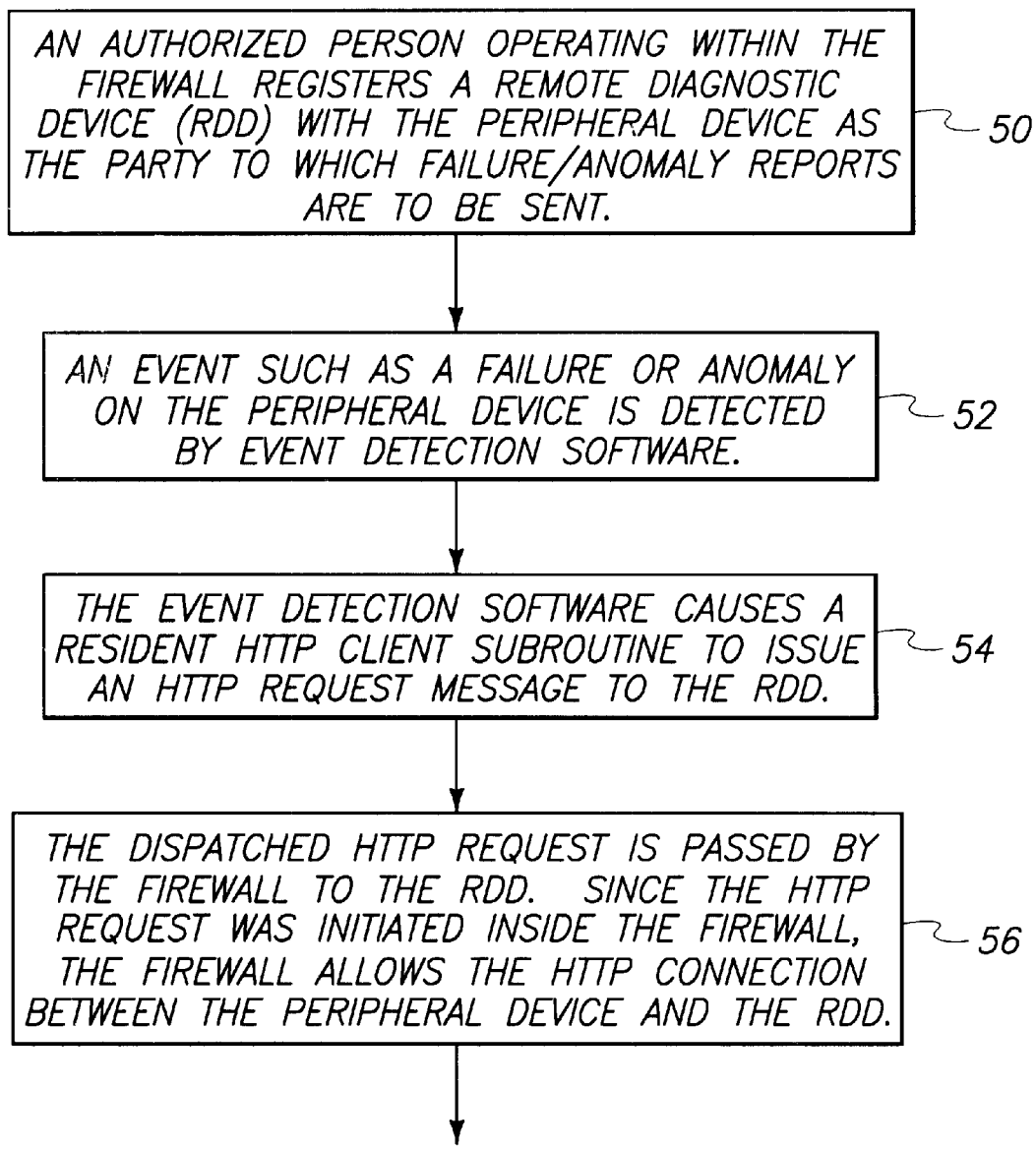

Referring to FIG. 1, system 10 includes a peripheral device 12, such as a printer, which comprises a central processing unit (CPU) 14 an input/output module (I/O) module 16, both of which are coupled via a bus 18 to a memory 20. Memory 20 includes an operating system 22 that, in combination with CPU 14, controls the overall operation of peripheral device 12.

Peripheral device 12 may either be directly coupled to other devices via a local network 21 or indirectly, via a host processor 25 as shown in FIG. 1a. Hereafter, the operation of the invention will be described in accord with the system shown in FIG. 1, however, it is to be understood that the systems of FIGS. 1 and 1a operate in a similar fashion insofar as the invention is concerned. Further, while controlling procedures will hereafter be described as already loaded into memory 20, such procedures may be incorporated into a memory media device 23, for loading on an as-needed basis.

Memory 20 (which may either be random access memory or read-only memory or a combination of the two) further includes an event registration and detection routine 24 (e.g. configured as a Java Virtual Machine (JVM)). It is to be understood that the JVM embodiment is an exemplary virtual operating system and that other, systems with similar functionalities may-be substituted therefor. Event registration and detection routine 24 is a general purpose computing software/firmware module that runs on CPU 14, interprets and converts JAVA code, for example, into instructions that are recognized by operating system 22, and functions in conjunction with CPU 14 to execute various diagnostic subroutines. Accordingly, event registration and detection routine 24 may have one or more associated diagnostic subroutines 26 or such subroutines may be downloaded via a procedure to be described below.

Also included within memory 20 is an HTTP client service 28 that employs the HTTP messaging protocol during communication over local network 21 and wide area network 30. A firewall device/software facility 32 is positioned as a local link between local network 21 and wide area network 30. In the known manner, firewall 32 blocks unwanted incoming message traffic from network 30 to peripheral device 12, unless that incoming message traffic is in response to a message dispatched from devices linked to local network 21 (e.g., via event registration and detection routine 24 from peripheral device 12).

A remote diagnostic device (RDD) 34 performs a diagnostic server function for peripheral device 12 (and other devices (not shown) coupled to network 30). RDD 34 comprises a computer that includes one or more executable diagnostic subroutines 36 that may be downloaded via network 30 and firewall 32, to peripheral device 12. RDD 34 also includes an interactive diagnostic procedure 38 that is adapted (i) to receive messages from a peripheral device indicating the results of remotely performed diagnostic actions; (ii) to analyze such results; (iii) to report the analysis back to the peripheral device or to a service person located at RDD 34 and/or (iv) to cause further executable diagnostic subroutines 34 to be dispatched to peripheral device 12.

RDD 34 further includes an HTTP server procedure 40 that, in the known manner, is adapted to receive incoming HTTP message requests and to dispatch responses thereto.

Turning now to FIGS. 2a, 2b, the method employed by the invention will be described. Initially, an authorized person operating from inside firewall 32, registers RDD 34 with peripheral device 12 as an "interested party" in events that occur on peripheral device 12. In other words, the registration action enables peripheral device 12 to know where to report operational anomalies.

At some later time, event registration and detection routine 24 (e.g., a JVM) recognizes a failure or anomaly in peripheral device 12 (step 52). Event registration and detection routine 24 then causes HTTP client procedure 28 to issue an HTTP Request message to RDD 34, as per the earlier registry, denoting the event and requesting diagnostic assistance (step 54). The dispatched HTTP Request message is passed by firewall 32 to RDD 34 and HTTP server procedure 40. Since the HTTP request message is initiated within firewall 32, firewall 32 allows the establishment of the HTTP connection between peripheral device 12 and RDD 34 (step 56).

In response (step 58), interactive diagnostic procedure 38 responds via the HTTP connection by either (1) dispatching a Request message to peripheral device 12 (and JVM 24) to run a resident diagnostic subroutine 26 or (2) dispatching an executable diagnostic subroutine to be run by JVM 24 or (3) asking peripheral device 12 to try again after some time has passed. Further, an alert message may be passed to a service person at RDD 34 or the anomaly report may be written to a log.

Upon receipt at peripheral device 12 (step 60), the Request message is interpreted by event registration and detection routine 24. Commands embedded in the Response message are then performed, such as executing a diagnostic subroutine 26.

The results of the diagnostic subroutine are then dispatched to RDD 34 as a new HTTP Request message (step 62), with interactive diagnostic procedure 38 receiving that message and proceeding, as necessary, with the dispatch of either further messages or an indication of the malfunction diagnosis.

Interactive diagnostic procedure 38, upon receiving the initial HTTP Request message from peripheral device 12, may also download, via the Response message, an executable diagnostic subroutine 36 from a library of such subroutines, via firewall device 32. Upon receipt of the Response message, the diagnostic subroutine is interpreted and executed on CPU 14. Thereafter, event registration and detection routine 24 causes HTTP client service 28 to issue a new HTTP Request message to RDD 34 indicating the results of the diagnostic action.

Interactive diagnostic procedure 38 then either causes a download of another diagnostic subroutine or outputs a message indicating its diagnosis of the problem. Thus, as shown in step 60, RDD 34 interactively controls event registration and detection routine 24 to run various diagnostic subroutines in accordance with received results. In such manner, System 10 is enabled to implement and carry out remote malfunction diagnosis even when a firewall device is present between the remote diagnostic device and the peripheral device manifesting the malfunction.

The use of a JVM to implement event registration and detection routine 24 provides an ability to install a diagnosis capability on many different kinds of machines, due to fact that the manufacturer of the device can build into the JVM an interpreter function which enables it to directly interface with the local operating system and CPU. Accordingly, RDD 34 is able to interrelate to multiple different peripheral devices using the Java language as the common interface language.

It should be understood that the foregoing description is only illustrative of the invention. Various alternatives and modifications can be devised by those skilled in the art without departing from the invention. For example, while each of the procedures are indicated as already loaded into memory, such subroutines may be stored on portable memory devices and installed when needed. Accordingly, the present invention is intended to embrace all such alternatives, modifications and variances which fall within the scope of the appended claims.

What is claimed is:

1. A peripheral device coupled to a network via firewall means which blocks unwanted incoming message traffic but allows incoming message traffic that is in response to a message dispatched from said peripheral device, said network further coupled to a remote device including code for diagnosing causes of peripheral device problems, said peripheral device comprising:

a processor for controlling operations of said peripheral device;

storage means for storing a diagnostic application that, in combination with said processor, is adapted to execute a diagnostic subroutine for diagnosing a cause of a malfunction; and communication means for (i) dispatching an event message to said remote device, via said firewall means and said network, and for (ii) receiving a response message thereto, via said firewall means, from said remote device, said response message causing said diagnostic application to execute a subroutine in an attempt to determine a cause of said event in said peripheral device.

2. The peripheral device as recited in claim 1, wherein said response message from said remote device includes an executable diagnostic subroutine that is caused to execute by said diagnostic application.

3. The peripheral device as recited in claim 2, wherein said remote device is configured to respond to response messages from said peripheral device with diagnostic results, to dispatch additional subroutines in accordance with said diagnostic results to enable further diagnostic actions to be executed in said peripheral device.

4. The peripheral device as recited in claim 1, wherein said network is the Internet and said event message is formatted as an HTTP messages.

5. The peripheral device as recited in claim 4, wherein said communication means comprises a subroutine that is adapted to dispatch HTTP-formatted messages and to receive responses thereto.

6. The peripheral device as recited in claim 1, wherein said peripheral device is a printer.

7. The peripheral device as recited in claim 1, wherein said diagnostic application is configured in the JAVA language.

8. The peripheral device as recited in claim 1, wherein said processor is integral to said peripheral device.

9. The peripheral device as recited in claim 1, wherein said processor comprises a host processor for operating said peripheral device.

10. The peripheral device as recited in claim 1, wherein said communication means comprises means for communicating results from said execution of said subroutine to said remote device, and for receiving another subroutine from said remote device responsive to said communicating results, and wherein said diagnostic application, in combination with said processor, is configured to execute said another subroutine in another attempt to determine said cause of said event in said peripheral device.

11. The peripheral device as recited in claim 10, wherein said communication means comprises means for communicating results from said execution of said another subroutine to said remote device.

12. A memory media for controlling a peripheral device that is coupled to a network via firewall means, said peripheral device including a processor associated with storage means for storing a diagnostic application that, in combination with said processor, is adapted to execute said diagnostic application to diagnose a cause of a malfunction, said firewall means configured to block unwanted incoming message traffic but to allow incoming message traffic that is in response to a message dispatched from said peripheral device, said network further coupled to a remote device including code for diagnosing causes of peripheral device problems, said memory media including code comprising:

a) means for causing said processor to dispatch an event message to said remote device, via said firewall means and said network;

b) means for causing said processor to receive a response message, via said firewall means, from said remote device; and c) means for causing said processor to respond to said response message by causing said diagnostic application to execute a subroutine in an attempt to determine a cause of said event in said peripheral device.

13. The memory media as recited in claim 12, wherein said response message from said remote device includes an executable diagnostic subroutine that is caused to execute by said diagnostic application.

14. The memory media as recited in claim 13, wherein said remote device is configured to respond to response messages from said peripheral device with diagnostic results, to dispatch additional subroutines in accordance with said diagnostic results to enable further diagnostic actions to be executed in said peripheral device.

15. The memory media as recited in claim 12, wherein means c) comprises a subroutine that is adapted to dispatch HTTP-formatted messages and to receive responses thereto.

16. The memory media as recited in claim 15, wherein said diagnostic application is configured in the JAVA language.

17. The memory media as recited in claim 12, wherein said memory media comprises code comprising:

d) means for causing said processor to communicate results from said execution of said subroutine to said remote device;

e) means for causing said processor to receive another responsive message comprising another subroutine responsive to said communication of said results; and f) means for causing said processor to respond to said another response message by causing said diagnostic application to execute said another subroutine in another attempt to determine said cause of said event in said peripheral device.

18. The memory media as recited in claim 17, wherein said memory media comprises code comprising:

g) means for causing said processor to communicate results from said execution of said another subroutine to said remote device.

19. A peripheral diagnostic method comprising:

providing a peripheral device comprising a diagnostic application;

communicating an event message to a remote device responsive to a malfunction;

receiving a response message responsive to said communicating said event message;

executing a subroutine using said diagnostic application in an attempt to determine a cause of said malfunction responsive to said receiving said response message;

communicating results of said executing of said subroutine to said remote device;

receiving another subroutine from said remote device responsive to said communicating said results; and executing said another subroutine using said diagnostic application in another attempt to determine said cause of said malfunction responsive to said receiving said another subroutine.

20. The method according to claim 19 further comprising communicating results of said executing said another subroutine to said remote device.

* * * * *

UNITED STATES PATENT AND TRADEMARK OFFICE
CERTIFICATE OF CORRECTION

PATENT NO. : 6,516,427 B1
DATED : February 4, 2003
INVENTOR(S) : Charles K. Keyes et al.

It is certified that error appears in the above-identified patent and that said Letters Patent is hereby corrected as shown below:

Column 5,
Line 67, delete "messages." and insert therefor -- message. --

Column 7,
Line 6, delete "responsive to" and insert therefor -- respone to --

Signed and Sealed this

Second Day of August, 2005

JON W. DUDAS
*Director of the United States Patent and Trademark Office*